United States Patent [19]
Takahama et al.

[11] Patent Number: 5,364,328
[45] Date of Patent: Nov. 15, 1994

[54] METAL MOULD REPLACING APPARATUS

[75] Inventors: Yo Takahama; Keitaro Yonezawa, both of Kobe, Japan

[73] Assignee: Kabushiki Kaisha Kosmek, Kobe, Japan

[21] Appl. No.: 62,756

[22] Filed: May 18, 1993

[30] Foreign Application Priority Data

Jun. 8, 1992 [JP] Japan .................. 4-174968

[51] Int. Cl.$^5$ .............. B23Q 3/10; B30B 15/00; B29C 45/00
[52] U.S. Cl. .................. 483/28; 72/446; 83/563; 100/224; 100/918; 425/185
[58] Field of Search .............. 483/28, 16, 29; 29/33 K, 33 P; 425/185, 190; 100/918, 224 R; 72/446, 442, 448; 83/563

[56] References Cited

U.S. PATENT DOCUMENTS

| | | | |
|---|---|---|---|
| 4,597,709 | 7/1986 | Yonezawa | 414/499 X |
| 5,063,648 | 11/1991 | Yonezawa et al. | 29/33 K |
| 5,217,727 | 6/1993 | Kameyama et al. | 425/185 |

Primary Examiner—William Briggs
Attorney, Agent, or Firm—Bacon & Thomas

[57] ABSTRACT

A rear portion of a chain transmission member (21) is connected to a push/pull drive device (19) disposed in the rear portion of the metal mould replacing stand (3) while a front portion of the transmission member (21) is connected to the advancing/retreating member (22). A guide rail (23) for accommodating the transmission member (21) and the advancing/retreating member (22) is placed in the upper portion of the replacing stand (3) so as to extend in the fore and rear direction. A front portion of a hook (28) is supported vertically swingably by a front portion of the advancing/retreating member (22) through a pin (29) and a concave engaging portion (30) is formed in the rear swingable portion of the hook (28) so as to face upward. An engaged portion (34) is formed in the rear portion of the metal mould (7) so as to project downward and the engaging portion (30) is adapted to be engaged with the engaged portion (34) by means of a spring (36) from below.

10 Claims, 6 Drawing Sheets

METAL MOULD REPLACING APPARATUS

BACKGROUND OF THE INVENTION

1. Field of the Invention

The present invention relates to a metal mould replacing apparatus which serves to replace a metal mould for use in a moulding machine such as an injection moulding machine and a press machine.

2. Description of the Prior Art

As such a metal mould replacing apparatus, there is the one disclosed in the U.S. Pat. No. 5,063,648 proposed previously by the inventors of the present invention. The conventional metal mould replacing apparatus disclosed therein comprises a metal mould replacing stand of the carriage type disposed behind an injection moulding machine, an advancing/retreating member provided movably in the fore, and rear direction along a guide rail placed on the carriage type replacing s rand and a hook vertically swingably supported by the advancing/retreating member so that an engaging portion formed in the front swingable portion of the hook can engage with an engaged portion of a rear portion of a metal mould from below.

Since the above-mentioned conventional replacing apparatus is adapted to swing the hook below the engaged portion of the metal mould, even when the metal mould sways at the time of placement onto the carriage type replacing stand by a crane and the like, the engaged portion can be prevented from colliding against the hook. Therefore, it becomes unnecessary to provide a space behind the replacing stand for retreating the advancing/retreating member and the hook, so that it becomes possible to decrease a width dimension of the replacing stand in the fore and rear direction by that omitted retreat space.

Accordingly, the conventional replacing apparatus has such an advantage that an area occupied at the time of running of the carriage type replacing stand can be reduced so that a building site of a moulding factory employing such an improved replacing stand can be reduced.

Incidentally, since the running distance of the carriage type replacing stand becomes longer and the area occupied by that running also tends to become larger correspondingly as a latest moulding factory is built is on a larger scale, it getting newly requested that the width dimension of the replacing stand in the fore and rear direction should be further decrease.

However, in the above-mentioned conventional apparatus, since the advancing/retreating member projects rearward comparatively a long distance beyond the engaging portion of the hook, it is necessary to largely extend the guide rail which accommodates the advancing/retreating member rearward and, in accompany of that, also a push/pull drive device for driving the advancing/retreating member projects largely rearward. Accordingly, since the width dimension of the replacing stand in the fore and rear direction can't help becoming larger by that projecting distance of the guide rail and the push/pull drive device, it is impossible to answer the aforementioned new request.

SUMMARY OF THE INVENTION

It is an object of the present invention to further decrease a width dimension of a metal mould replacing stand in the fore and rear direction.

For accomplishing the above-mentioned object, the present invention is constructed as follows, for example as shown in FIGS. 1 through 5.

A metal mould replacing stand 3 is disposed at the rear R of a moulding machine I and has a metal mould moving path 14 provided thereon in the fore and rear direction. To a push/pull drive device 19 disposed in the rear portion of the metal mould replacing stand 3, a rear portion of a transmission member 21 is connected as well as a front portion of the transmission member 21 is connected to an advancing/retreating member 22. A guide rail 23 which accommodates the transmission member 21 and the advancing/retreating member 22 is placed along said metal mould moving path 14. A hook 28 is supported vertically swingably by the advancing/retreating member 22 and has an engaging portion 30 formed in the rear swingable portion thereof so as to engage with an engaged portion 34 of a rear portion of a metal mould 7 from below.

The present invention functions as follows.

When the hook 28 at the forward advanced position is made to engage with the metal mould 7 placed on the metal mould replacing stand 3, the advancing/retreating member 22 is made to retreat toward the rear side R by means of the push/pull drive device 19 through the transmission member 21. Thereupon, the engaging portion 30 formed in the rear portion of the hook 28 approaches the engaged portion 34 provided in the rear portion of the metal mould 7 and then the engaging portion 30 engages with the engaged portion 34 from below.

Under that engaged condition, since the engaging portion 30 is formed in the rear portion of the hook 28 supported by the advancing/retreating member 22, it becomes possible to locate the advancing/retreating member 22 in front F of the engaging portion 30. Therefore, it becomes unnecessary to extend the guide rail 23 which accommodates the advancing/retreating member 22 rearward. In accompany of that, since it becomes unnecessary to project also the push/pull drive device 19 rearward, the width dimension W of the metal mould replacing stand 3 in the fore and rear direction becomes: smaller by that omitted projecting distance.

Accordingly, in the case of the replacing stand of the: carriage type, an area occupied at the time of its running can be reduced, and in the case of the replacing stand of the stationary type, its installation area can be reduced. Consequently, a building site of the moulding factory carl be reduced, so that also a building cost thereof can be reduced.

Incidentally, when the engaged portion 34 is provided the lower portion of the plate 32 fixedly secured to the rear surface of the metal mould 7, a rearward projecting distance of the engaged portion 34 becomes less. Therefore, the width dimension of the metal mould replacing stand 3 in the fore and rear direction can be further decreased by that lessened projecting distance.

Further, when an upper surface 28a of the hook 28 is formed by a rearward ascending inclined surface, the following advantages can be obtained. When the hook 28 at the retreat position is advanced toward the metal mould 7 placed within the moulding machine 1, firstly a midway portion of the hook upper surface 28a in the fore and rear direction is brought into contact with the lower end of the engaged portion 34 of the metal mould 7 and then the hook 28 is made to swing downward automatically by a reaction force exerted from the engaged portion 34. When the downward swung hook 28 is made to swing upward by means of a spring force and the like, the engaging portion 30 thereof engages with the engaged portion 34 of the mould 7 automatically. Accordingly, the construction for making the hook 28 engage with the metal mould 7 can be simplified.

Furthermore, when a cam surface 28b adapted to be brought into contact with the engaged portion 34 of the metal mould 7 from below is formed in the rear portion the hook 28 in a rearward descending configuration, the following advantages can be obtained. When the hook 28 the advanced position is made to retreat toward the metal mould 7 placed on the replacing stand 3, firstly the cam surface 28b is brought in [o contact with the engaged portion 34 and then the hook 28 is swung downward by means of a reaction force exerted from the engaged portion 34. When the downward swung hook 28 is made to swing upward by means of a spring force and the like, the engaging portion 3(2) engages with the engaged portion 34 automatically. Therefore, from this point of view, the construction for making the hook 28 engage with the metal mould 7 can be simplified.

BRIEF DESCRIPTION OF THE DRAWINGS

The above and other important features of the present invention will be better understood from the following detailed descriptions of preferred embodiments of the invention, made with reference to the accompanying drawings, in which.

DESCRIPTION OF THE PREFERRED EMBODIMENTS

First Embodiment

Figure 1:
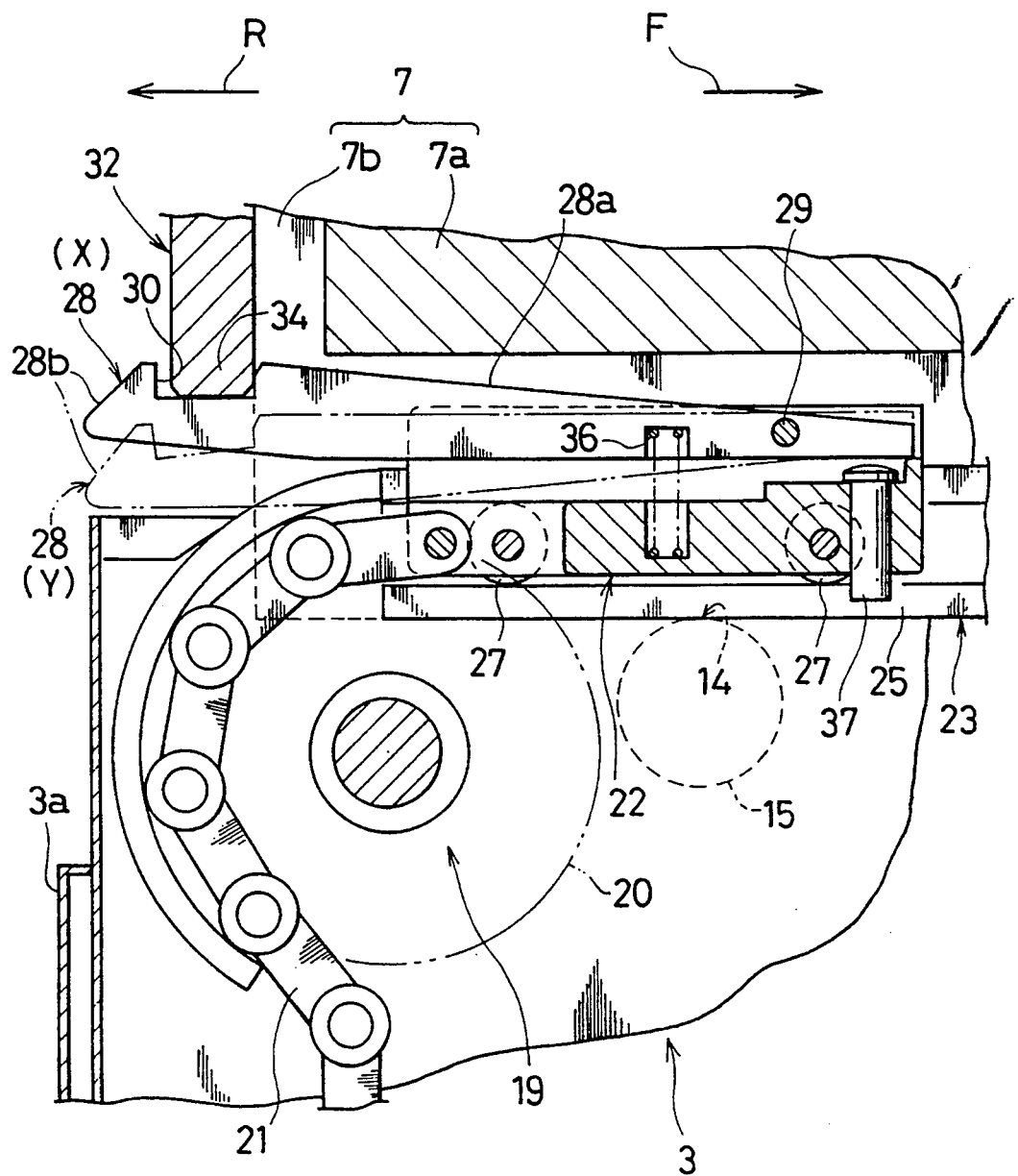
FIG. 1 is a view showing a principal portion of a metal mould replacing apparatus of a first embodiment of the present invention and a sectional view taken along the I—I arrow line in FIG. 2.
Figure 2:
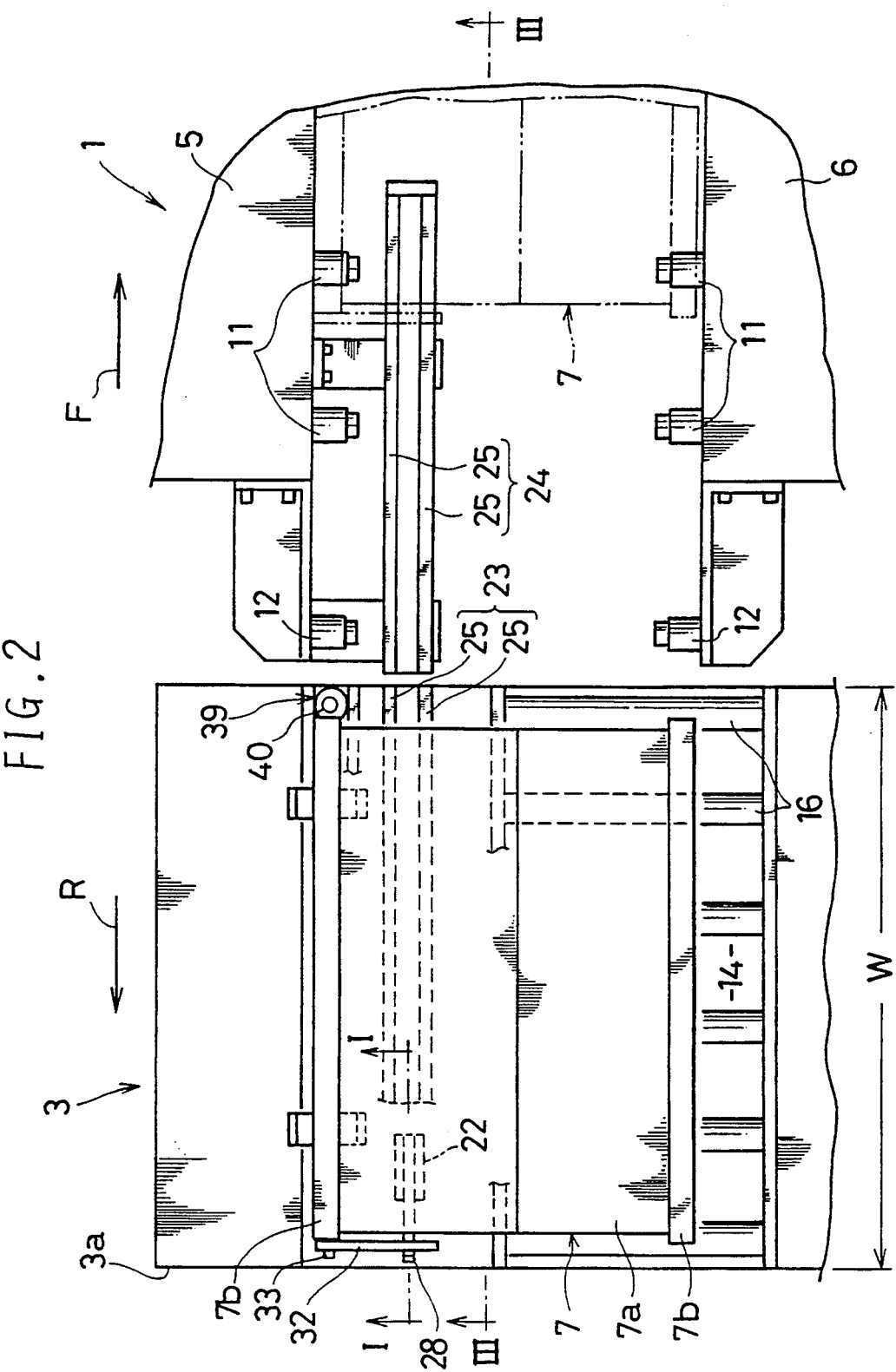
FIG. 2 is a plan view of the metal mould replacing apparatus.
Figure 3:
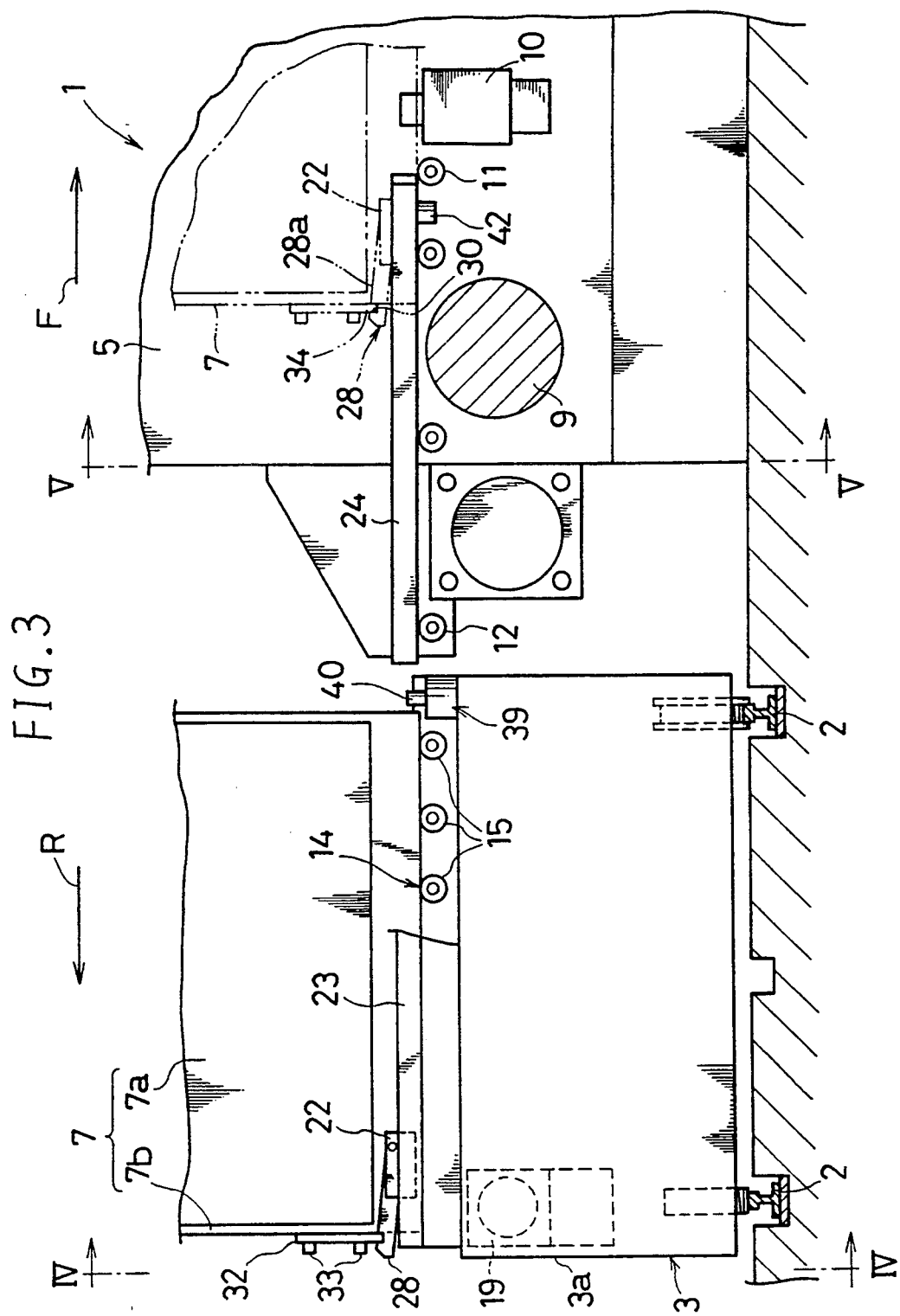
FIG. 3 is a sectional view taken along the III—III arrow line in FIG. 2.
Figure 4:
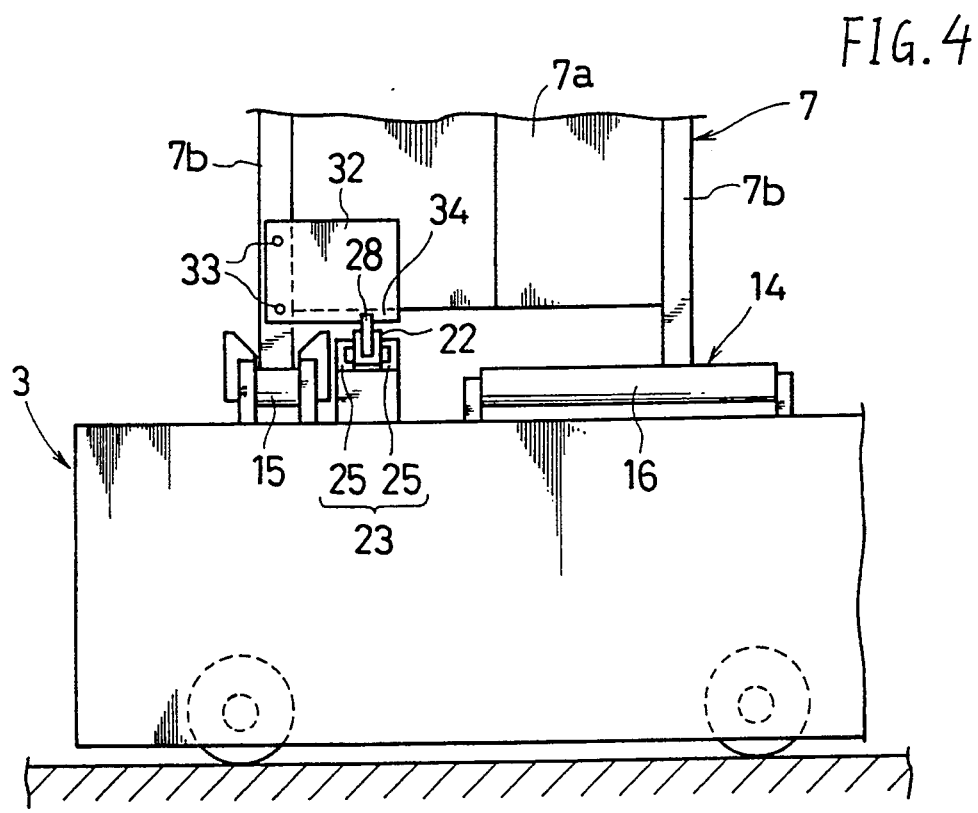
FIG. 4 is a view along the IV—IV arrow line in FIG. 3.
Figure 5:
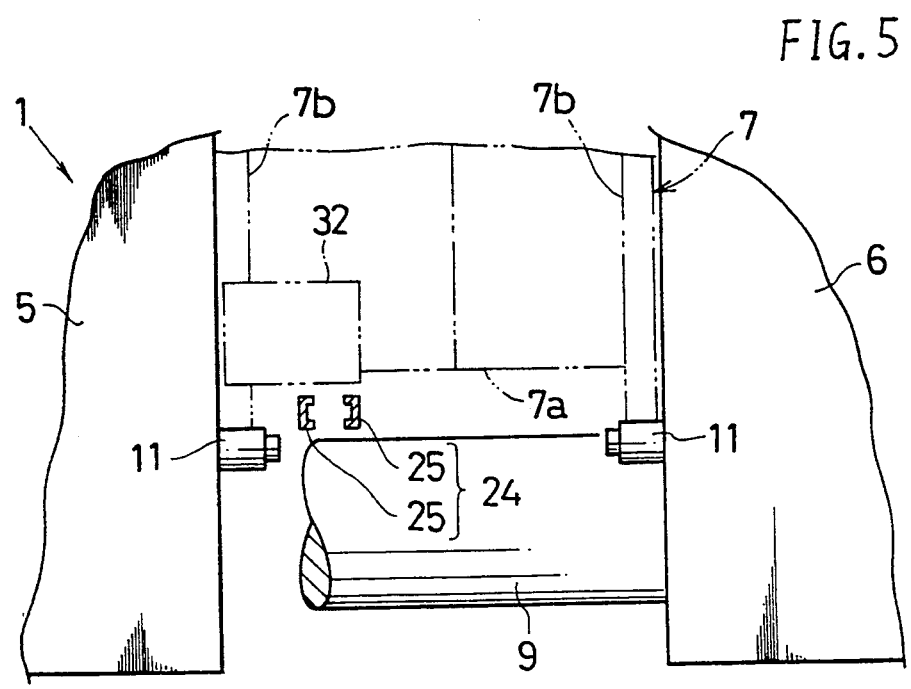
FIG. 5 is a view along the V—V arrow line in FIG. 3.

FIGS. 1 through 5 show a first embodiment of a metal mould replacing apparatus. Incidentally, for the sake of the following description in relation to an orientation of the metal mould replacing apparatus, the right sides of FIGS. 1 through 3 are defined as the foreside F and the left sides thereof are defined as the rear side R.

A pair of rails 2, 2 are placed at the rear R of an injection moulding machine 1 employed herein as a moulding machine, and a metal mould replacing stand 3 of the carriage type is movable along these rails 2, 2.

The injection moulding machine 1 is so constructed that a metal mould 7 can be mounted between a fixed plate 5 and a movable plate 6. The metal mould 7 comprises a metal mould body portion 7a and a pair of plate portions 7b fixedly secured to the opposite sides thereof. The symbol 9 designates a tie rod, the symbol 10 does a hydraulic clamp for fixing the metal mould, the symbol 11 does a roller inside the plates and the symbol 12 does a pre-roller.

A metal mould moving path 14 is provided in the upper portion of the metal mould replacing stand 3 so as to extend in the fore and rear direction (the direction along the arrows F, R). This moving path 14 comprises many short rollers 15 and many long rollers 16. An electric push/pull drive device 19 is disposed in the rear portion of the replacing stand 3. A rear portion of a chain transmission member 21 meshes with a sprocket wheel 20 of the drive device 19 while a front portion of the transmission member 21 is connected to an advancing/retreating member 22. A first guide rail 23 for guiding the transmission member 21 and the advancing-/retreating member 22 in the fore and rear direction is placed between both those rollers 15, 16.

A second guide rail 24 is placed in the injection moulding machine 1 so as to align with the first guide rail 23. This guide rail 24 is disposed at a midway level between the tie rod 9 and the metal mould body portion 7a. The respective guide rails 23, 24 comprise a pair of rail members 25, 25 having C-shaped cross-sections and facing to each other.

The sprocket wheel 20, the transmission member 21 and the guide rollers 27, 27 for the advancing/retreating member 22 are interposed between both the rail members 25, 25. A front portion of a hook 28 is supported vertically swingably by the front portion of the advancing/retreating member 22 through a pivot pin 29. An upper surface 28a of the hook 28 comprises a rearward ascending inclined surface. A concave engaging portion 30 is formed in the rear swingable portion of the hook 28 so as to face upward. A thin plate 32 is fixedly secured to the rear surface of the plate portion 7b of the metal mould 7 by means of a plurality of bolts 33. A convex engaged portion 34 is provided in the lower portion of the plate 32.

As shown mainly in FIG. 1, the hook 28 is adapted to be advanced to an engagement position X ( refer to a figure depicted by the solid line ) on the upper side by means of a spring 36 and to be retreated to an engagement cancelled position Y ( refer to a figure depicted by the alternate long and two short dashes line ) on the lower side when a pin 37 supported at the front portion of the advancing/retreating member 22 is raised by means of an engagement cancelling cylinder ( to be later explained).

The metal mould replacing apparatus having the above-mentioned construction is utilized as follows.

Under the condition that the metal mould 7 is placed on the metal mould replacing stand 3, as shown in the solid line figure, the forward and rearward movements of the mould 7 are prevented by the hook 28 on the rear side R and a piston rod 40 of a drop prevention cylinder 39 on the foreside F.

The operation for bringing the metal mould 7 into the injection moulding machine 1 is carried out by the following procedures. Firstly, the piston rod 40 is made to retreat downward. Then, the sprocket wheel 20 is made to rotate clockwise in FIG. 1 so as to advance the advancing/retreating member 22 toward the foreside F along the first guide rail 23 and the second guide rail 24 in order and to move the metal mould 7 toward the foreside F. When the metal mould 7 and the advancing/retreating member 22 arrive at a predetermined position (refer to a figure depicted by the long and two short dashes line) in the injection moulding machine 1, a limit switch (not illustrated) detects that arrival so that the rotation of the sprocket wheel 20 is stopped. After that, the metal mould 7 is fixed by means of the hydraulic clamp 10.

Subsequently, the hook 28 is made to change over to the engagement cancelled position Y by means of an engagement cancelling cylinder 42 (refer to FIG. 3) provided in the second guide rail 24, through the pin 37 (refer to FIG. 1). By rotating the sprocket wheel 20 counterclockwise in FIG. 1 under this condition, the advancing/retreating member 22 is made to retreat toward the rear side R and to return to the rear portion of the replacing stand 3.

The operation for bringing out the metal mould 7 in the injection moulding machine I onto the replacing stand 3 is carried out by the following procedures. When the advancing/retreating member 22 located in the rear portion of the replacing stand 3 is made to advance toward the foreside F along the first guide rail 23 and the second guide rail 24, the upper surface 28a of the hook 28 is brought into contact with the bottom surface of the engaged portion 34 in accompany of the advancement of the advancing/retreating member 22 and then the hook 28 is made to swing downward against the spring 36 by means of a reaction force acting onto the upper surface 28a from the engaged portion 34. When the advancing/retreating member 22 further advances and the engaging portion 30 approaches the engaged portion 34, the hook 28 is made to swing upward by means of the spring 36, so that the engaging portion 30 engages with the engaged portion 34. After that, the advancing/retreating member 22 is made to retreat toward the rear side R so as to bring out the metal mould 7.

Incidentally, when the hook 28 at the advanced position is made to engage with the metal mould 7 placed on the replacing stand 3, in accompany of the retreating of the advancing/retreating member 22, firstly a cam surface 28b formed in the rear end of the hook 28 is brought into contact with the bottom surface of the engaged portion 34 and then the hook 28 is made to swing downward against the spring 36 by means of a reaction force acting onto the cam surface 28b from the engaged portion 34. When the advancing/retreating member 22 further retreats so that the engaging portion 30 approaches the engaged portion 34, the hook 28 is made to swing upward by means of the spring 36 so that the engaging portion 30 engages with the engaged portion 34.

According to the above-mentioned construction, since the advancing/retreating member 22 is disposed in front F of the engaging portion 30, it becomes unnecessary to rearward project the first guide rail 23 which accommodates the advancing/retreating member 22 and accordingly it becomes also unnecessary to project the push/pull drive device 19 rearward. Thereby, it becomes possible to shorten a distance from the engaging portion 30 to the rear surface 3a of the metal mould replacing stand 3 and to decrease the width dimension W of the replacing stand 3 in the fore and rear direction by that shortened portion.

Figure 6:
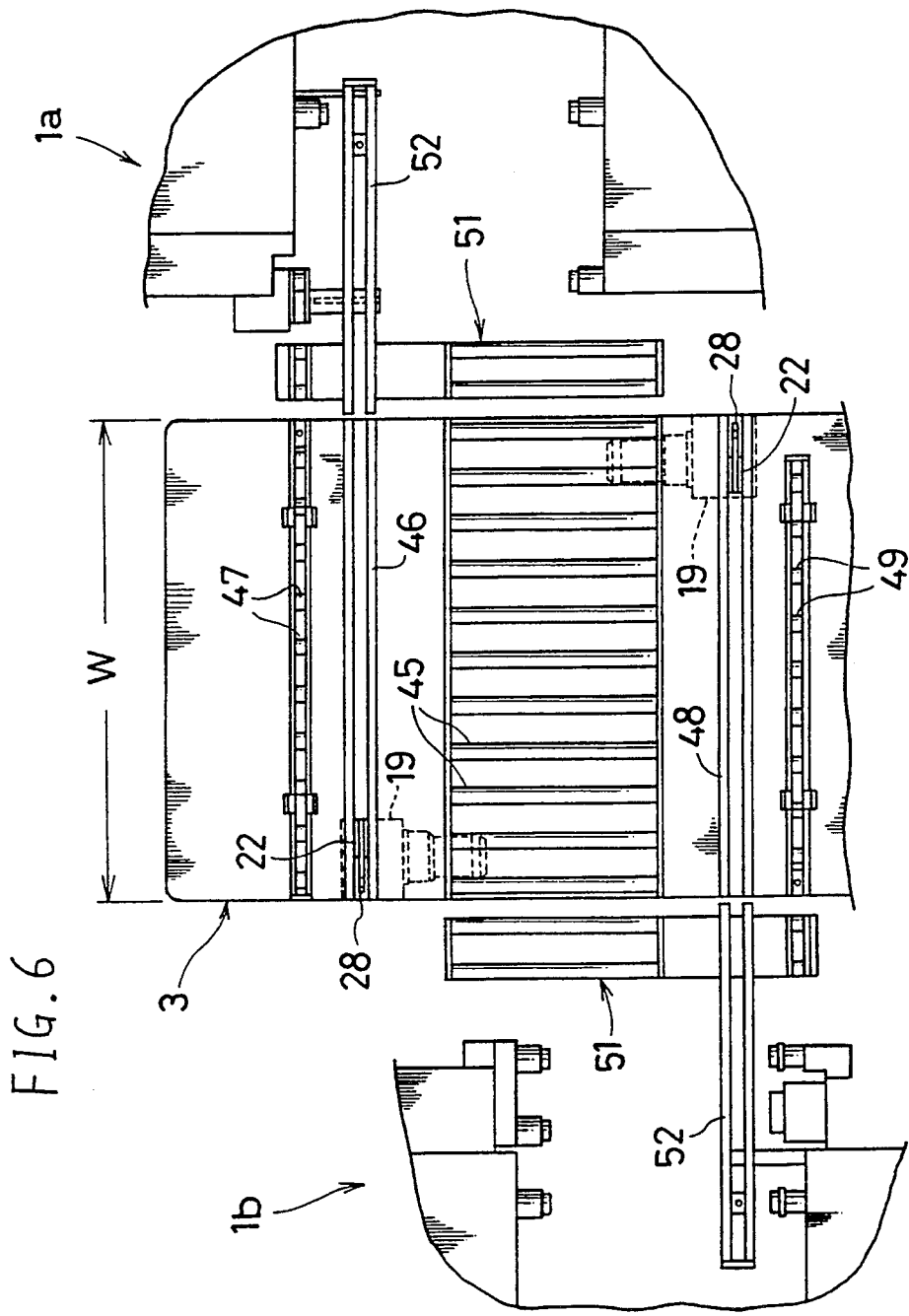
FIG. 6 plan view of a metal mould replacing apparatus of a second embodiment thereof.
Figure 7:
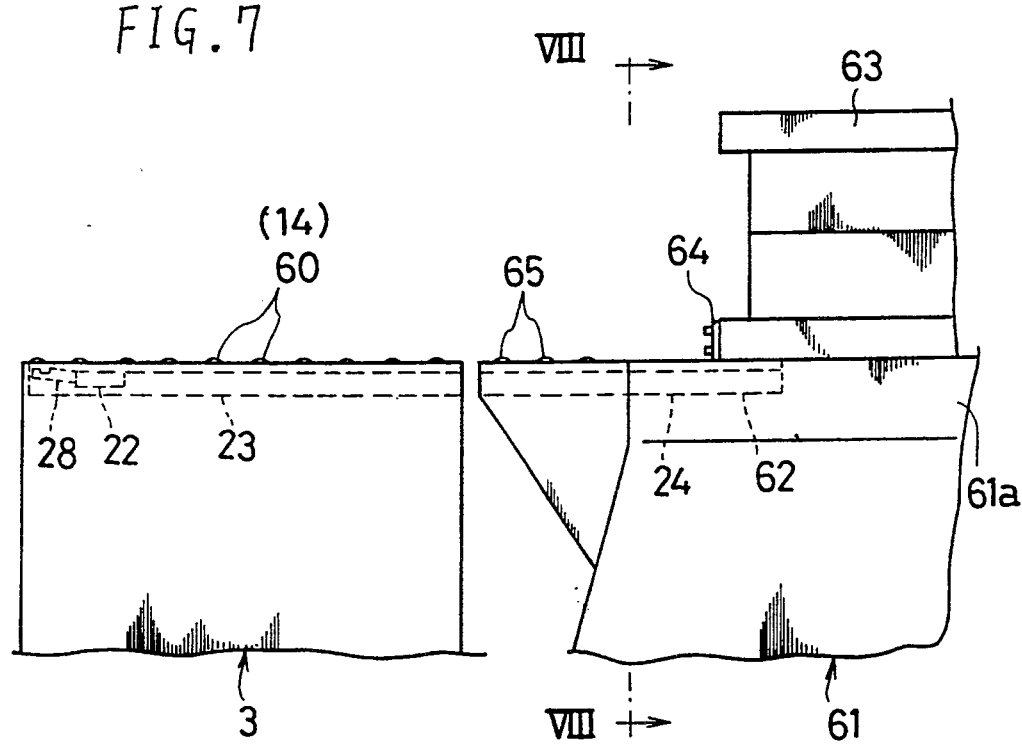
FIG. 7 is an elevation of a metal mould replacing apparatus of a third embodiment thereof.
Figure 8:
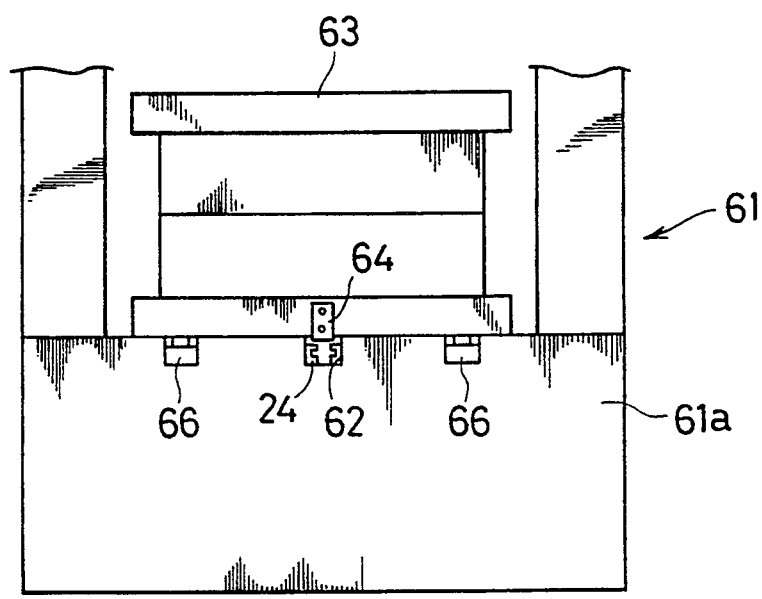
FIG. 8 is a view along the VIII—VIII arrow line in FIG. 7.

FIG. 6 and FIGS. 7 and 8 show a second embodiment and a third embodiment of the present invention respectively. In these embodiments, component members having the same constructions as those of the above-mentioned first embodiment are designated by the same symbols in principle.

Second Embodiment

In FIG. 6 showing the second embodiment, the metal mould replacing stand 3 of the carriage type is disposed between two fore and rear injection moulding machines 1a, 1b so as to be movable in the left and the right directions (in the vertical directions in FIG. 6). Both a first guide rail 46 and short rollers 47 for the first injection moulding machine 1a and both a first guide rail 48 and short rollers 49 for the second injection moulding machine 1b are arranged respectively at the left and at the right outside common long rollers 45 disposed in the replacing stand 3. Pre-roller devices 51. 51 and second guide rails 52, 52 are provided in the respective injection moulding machines 1a, 1b.

A pair of advancing/retreating members 22, 22 are so disposed as to face each other in the end portions of the first guide rails 46. 48 facing each other. The symbol 28 designates the hook, and the symbol 19 does the push/pull drive device.

According to the above-mentioned construction, by shortening the respective dimensions from the engaging portions of the respective hooks 28 to the respective front and rear end sur faces of the metal mould replacing stand 3, the width dimension W of the replacing stand 3 in the fore and rear direction can be further decreased by those shortened portions.

Third Embodiment

In the third embodiment shown in FIGS. 7 and 8, the metal mould replacing apparatus according to the present invention is applied to a press machine.

The first guide rail 23 provided in the metal mould replacing stand 3 of the carriage type is disposed at a lower level below the upper sur face of the replacing stand 3. The advancing/retreating member 22 and the hook 28 are accommodated by the first guide rail 23. The symbol 60 designates a transfer roller and the metal mould moving path 14 is defined by the upper surfaces of the rollers 60.

A concave groove 62 is formed in a bolster 61 a of a press machine 61 so as to extend in the fore and rear direction and the second guide rail 24 is inserted into the concave groove 62. A lower portion of a plate 64 fixedly secured to a rear surface of a metal mould 63 is made to project in to the concave groove 62. Tile symbol 65 designates a pre-roller device and the symbol 66 does a transfer roller device.

The above-mentioned respective embodiments may be modified as follows.

The metal mould replacing stand 3 may be of the stationary type instead of the carriage type.

The metal mould moving path 14 of the replacing stand 3 may comprise a flat surface instead of the rollers.

The transmission member 21 may comprise a belt, a wire and the like instead of the chain.

The engaging portion 30 of the hook 28 may be formed in a convex configuration and the engaged portion 34 of the metal mould 7 may be formed in a concave configuration.

As many other different embodiments of the invention will be obvious to those skilled in the art, some of which have been disclosed or referred to herein, it is to be understood that the specific embodiments of the invention as presented herein are intended to be by way of illustration only and are not limiting on the invention, and it is to be understood that such embodiments, changes, or modifications may be made without departing from the spirit and scope of the invention as set forth in the claims appended hereto.

What is claimed is:

1. A metal mould replacing apparatus comprising:
   a metal mould replacing stand (3);
   a metal mould (7) having an engaged portion (34), said mould being placed on said stand forming an area therebetween;
   a metal mould moving path (14) provided in said metal mould replacing stand (3) and extending to a moulding machine (1);
   a push/pull drive device (19) provided in said metal mould replacing stand (3);
   a transmission member (21) having a front end and a rear end, said rear end being connected to said drive device (19);
   an advancing/retreating member (22) to which the front end of said transmission member (21) is connected;
   a guide rail (23) disposed in said metal mould replacing stand (3) along said moving path (14) for guiding said transmission member (21) and said advancing/retreating member (22); and
   a hook (28) having a first portion extending into the area between the stand and the metal mould and a second portion extending opposite said first portion, said first portion being pivotally supported by said advancing/retreating member (22) and said second portion being provided with an engaging portion (30) adapted to be engaged with said engaged portion (34) from below,
   wherein said first portion of the hook, when the hook is engaged with said engaged portion, is positioned entirely within the area between the stand and the mould and said transmission member being at least partly within the area between the stand and the mould thus enabling the replacing stand to be smaller.

2. A metal mould replacing apparatus as set forth in claim 1, wherein a plate (32) is fixedly secured to a rear portion of said metal mould (7), and said engaged portion (34) is provided in a lower portion of said plate (32).

3. A metal mould replacing apparatus as set forth in claim 2, wherein an upper surface (28a) of said hook (28) comprises a rearward ascending inclined surface.

4. A metal mould replacing apparatus as set forth in claim 2, wherein a cam surface (28b) adapted to be brought into contact with said engaged portion (34) from below is formed in the second portion of said hook (28) so as to descend rearward.

5. A metal mould replacing apparatus as set forth in claim 3, wherein a cam surface (28b) adapted to be brought into contact with said engaged portion (34) from below is formed in the second portion of said hook (28) so as to descend rearward.

6. A metal mould replacing apparatus comprising:
   a metal mould replacing stand (3);
   a metal mould (7) having an engaged portion (34), said mould being placed on said stand forming an area therebetween;
   a metal mould moving path (14) provided in said metal mould replacing stand (3) and extending to a moulding machine (1);
   a push/pull drive device (19) supported by said metal mould replacing stand (3);
   an advancing/retreating member (22) having first and second opposing ends;
   a transmission member (21) drivingly connected to said drive device (19), said transmission member having a first end connected to the second end of said advancing/retreating member;
   a guide rail (23) carried by said metal mould replacing stand (3) along said moving path (14) for guiding said transmission member (21) and said advancing/retreating member (22); and
   a hook (28) having a first portion extending into the area between the stand and the mould and a second portion extending opposite said first portion, said first portion being pivotally supported by the first end of said advancing/retreating member (22) and said second portion being provided with an engaging portion (30) adapted to be engaged with said engaged portion (34) from below;
   wherein said first portion of the hook, when the hook is engaged with said engaged portion, is positioned entirely within the area between the stand and the mould thus enabling the replacing stand to be smaller.

7. A metal mould replacing apparatus as set forth in claim 6, wherein a plate (32) is fixedly secured to a rear portion of said metal mould (7), and said engaged portion (34) is provided in a lower portion of said plate (32).

8. A metal mould replacing apparatus as set forth in claim 7, wherein an upper surface (28a) of said hook (28) includes an ascending inclined surface.

9. A metal mould replacing apparatus as set forth in claim 8, wherein a cam surface (28b) adapted to be brought into contact with said engaged portion (34) from below is formed in the second portion of said hook (28).

10. A metal mould replacing apparatus as set forth in claim 7, wherein a cam surface (28b) adapted to be brought into contact with said engaged portion (34) from below is formed in the second portion of said hook (28).

* * * * *